June 13, 1950 D. G. GRISWOLD 2,511,435
VACUUM BREAKER VALVE
Original Filed May 21, 1945 2 Sheets-Sheet 1

Inventor
Donald G. Griswold
By Bacon + Thomas
Attorneys

June 13, 1950 D. G. GRISWOLD 2,511,435
VACUUM BREAKER VALVE
Original Filed May 21, 1945 2 Sheets-Sheet 2

Inventor
Donald G. Griswold
Bacon & Thomas
Attorneys

Patented June 13, 1950

2,511,435

UNITED STATES PATENT OFFICE 2,511,435

VACUUM BREAKER VALVE

Donald G. Griswold, Alhambra, Calif., assignor to Clayton Manufacturing Company, Alhambra, Calif., a corporation of California Original application May 21, 1945, Serial No. 595,007. Divided and this application May 21, 1945, Serial No. 595,005

9 Claims. (Cl. 137—153)

This invention relates to vacuum breaker valves and more particularly to a vacuum breaker valve adapted to be employed in a backflow prevention unit such as disclosed in my application Serial No. 595,007, filed of even date herewith, and of which the present application is a division. However, it is to be understood that the present valve is not limited to use in a backflow unit, although it operates remarkably successfully in such unit.

The principal object of the invention is to provide an automatic vacuum breaker valve which is very sensitive in its operation and which will open immediately upon the occurrence of a vacuum condition in the line to which it is connected.

Another object of the invention is to provide a vacuum breaker valve which operates quietly and closes gradually against line pressure and avoids all hammering and shock in the line.

Still another object of the invention is to provide a vacuum breaker valve whose opening action is speeded by the vacuum condition itself, once atmospheric pressure has raised the valve disc from its seat.

A further object of the invention is to provide an automatic vacuum breaker valve which is positive in its operation and which will close promptly in response to the pressure of water flowing therethrough and cut off such flow.

Other objects and advantages of the invention will be apparent from the following description taken in conjunction with the accompanying drawings, in which.

Figure 1:
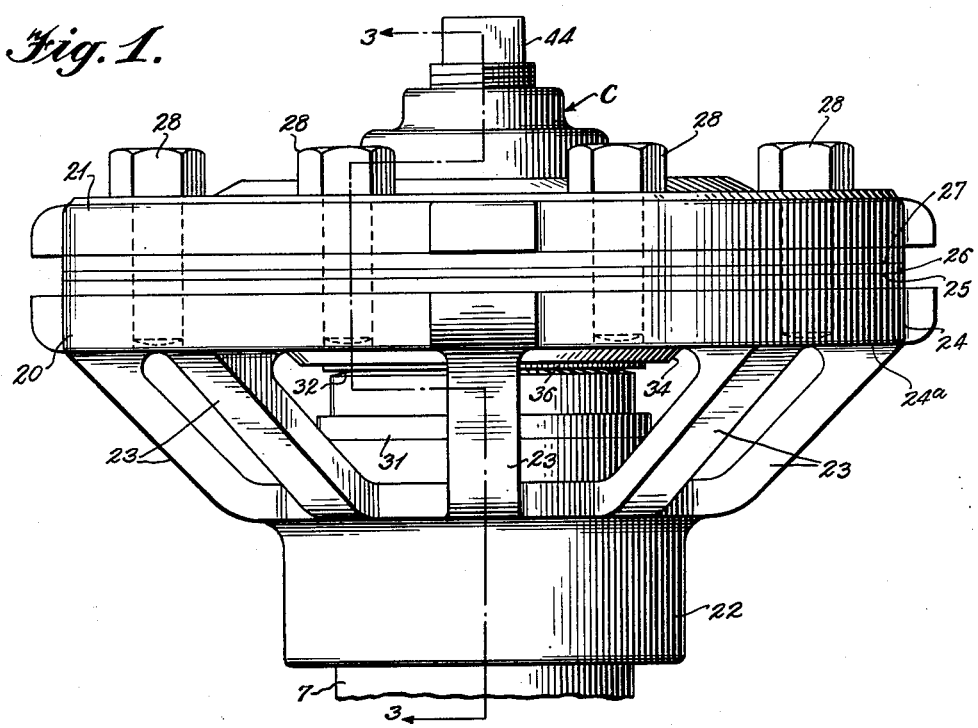
Fig. 1 is a side elevational view of a vacuum breaker valve constructed in accordance with the principles of the present invention.
Figure 2:
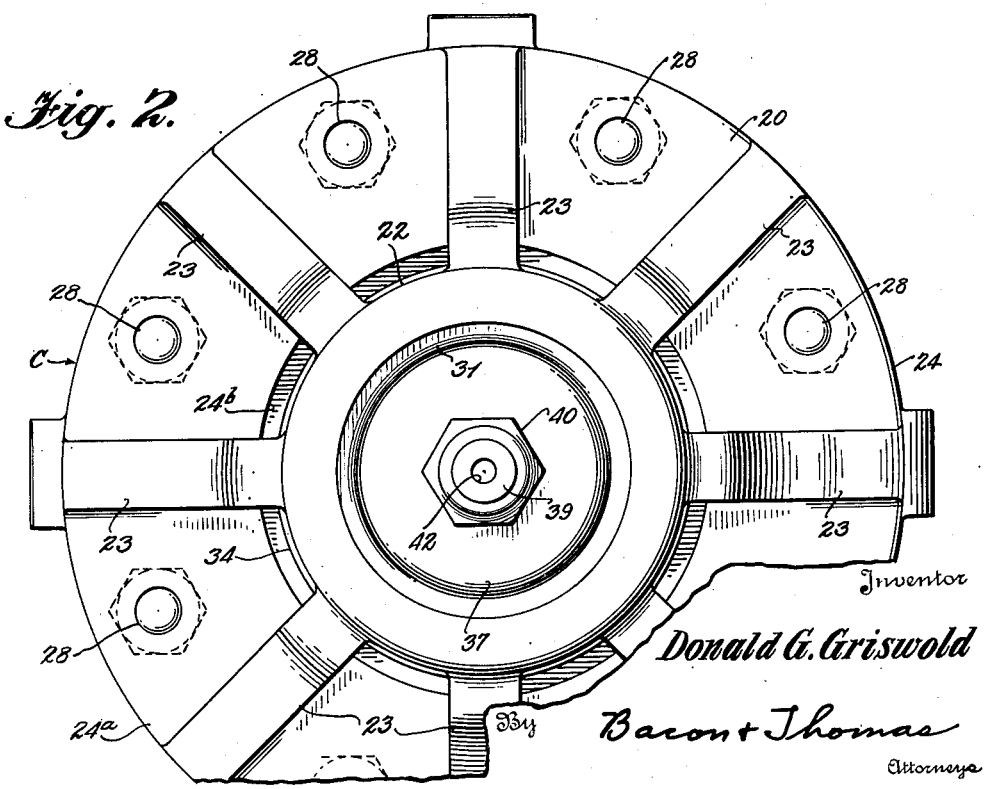
Fig. 2 is an inverted plan view of the vacuum breaker valve shown in Fig. 1.
Figure 3:
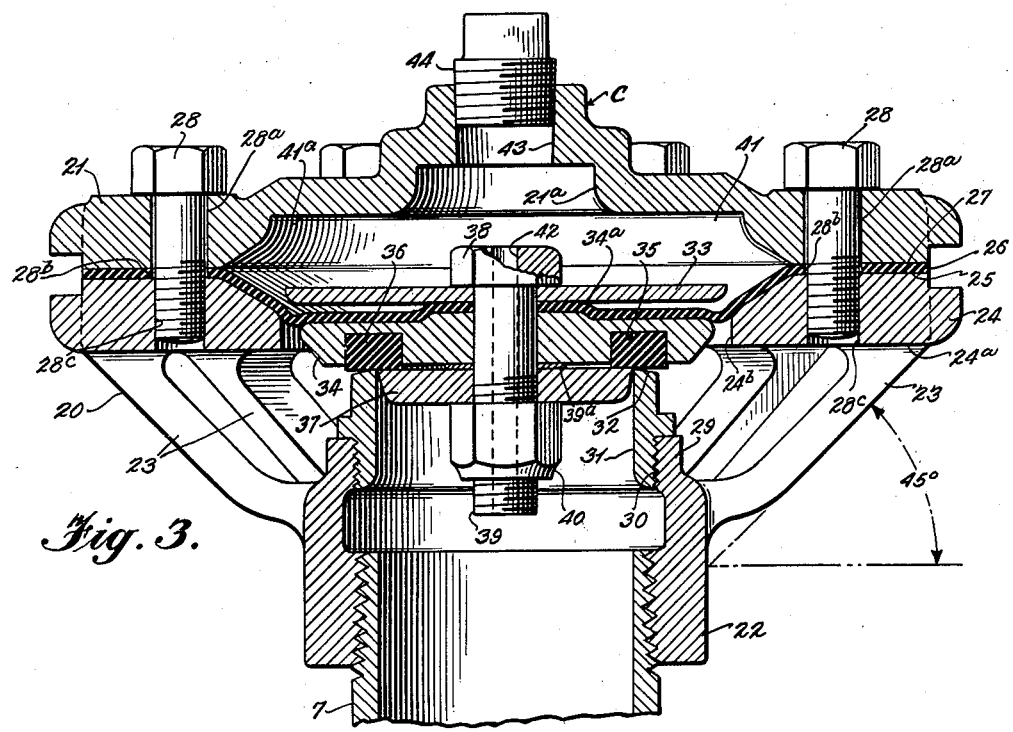
Fig. 3 is a vertical sectional view through the vacuum breaker valve taken on the line 3—3 of Fig. 1 and showing the valve in its closed position.

Referring now to the drawings, the vacuum breaker valve is generally identified by the letter C. The valve C comprises two main housing sections, namely, a body 20 and a cover 21. The body 20 includes an annular inlet portion 22 which is internally threaded for the reception of a pipe 7 or other fitting for connecting the valve C with a pipe line (not shown). The body 20 further includes a suitable number of radially outwardly and upwardly inclined arms 23 projecting on an angle of about 45° from the outer peripheral surface of the annular portion 22 to the lower surface 24a of an annular flange 24 having a substantially flat upper surface 25 and a central opening 24b concentric with the inlet 22. The surface 25 engages one side of a flexible diaphragm 26 at the margin thereof. The cover 21 has a complemental lower flat surface 27 engaging the opposite side of the marginal portion of the diaphragm 26. The diaphragm 26 is clamped between the cover 21 and the annular flange 24 and maintained in assembled relation therewith by a plurality of bolts 28 (Fig. 3) which extend through openings 28a in the cover 21, openings 28b in the diaphragm 26, and into threaded openings 28c in the annular flange 24.

The inlet portion 22 terminates at its upper end in an annular internally threaded neck portion 29 adapted to receive an externally threaded portion 30 of a valve seat member 31. The upper end of the valve seat member 31 is preferably inclined on an angle of about 5° to form a tapered seating surface, as indicated at 32.

A flat backing plate or diaphragm disc 33 is disposed on the inner side of the diaphragm 26 and a valve disc 34 having a central, flat-topped protuberance 34a is arranged upon the outer, exposed side of said diaphragm. This arrangement is very important because it permits free floating of the diaphragm 26 over about 85% of the area thereof between the discs 33 and 34 and reduces buckling tendencies and provides flexible, sensitive operation. The discs 33 and 34 are also made as large as possible consistent with the necessary flexing movement of the diaphragm 26 and the size of said diaphragm, and this is an important factor in distributing the lifting and sealing forces acting upon said diaphragm. The disc 34 is provided with an annular groove 35 in which an annular fiber or plastic sealing member 36 is disposed, said sealing member being non-adhering after long periods of contact and cooperable with the surface 32 of the seat member 31 to control the venting of the pipe 7 to the atmosphere through said seat member. A retaining member 37 engages the inner portion of the lower side of the sealing member 36, and a bolt 38 has its head engaging the plate 33 and its shank 39 extended through the plate 33, diaphragm 26, disc 34, and retaining member 37, and a self-locking nut 40 on said shank secures said parts in assembled relation. Spacer means 39a in the form of one or more fibre washers 39a is disposed between the disc 34 and retaining member 37 to permit the necessary clamping pressure to be applied to the central portion of the diaphragm 26 without causing such distortion of the sealing member 36 as would result in faulty seating.

Figure 4:
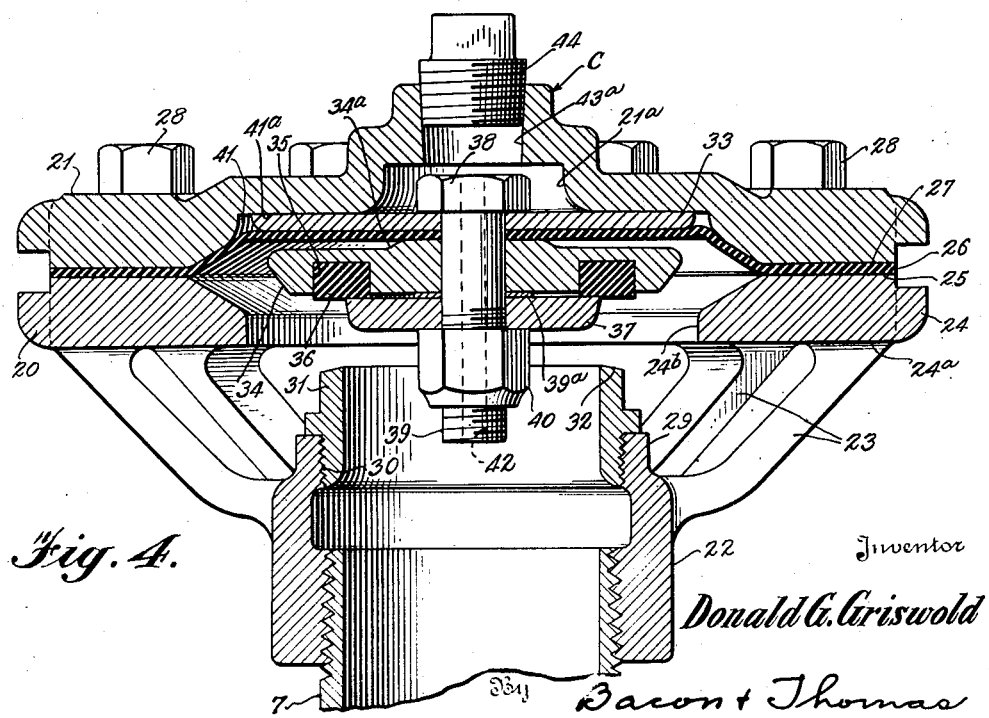
Fig. 4 is a view similar to Fig. 3 but showing the vacuum breaker valve in its wide open position.

The housing section or cover 21 is recessed to provide a pressure chamber 41 at the upper side of the diaphragm 26 adapted to receive operating fluid under pressure effective to flex the diaphragm 26 downwardly and thus urge the sealing member 36 into engagement with the seat 32. A longitudinal passage 42 in the bolt shank 39 establishes communication between the inlet 22 and the chamber 41. The cover 21 is also provided with a threaded opening 43 closed by a plug 44. However, the opening 43 and the plug 44 may be omitted when the valve C is used as a vacuum breaker valve, inasmuch as their purpose is to adapt the cover 21 for test purposes, or for universal use, say with a fluid pressure operated valve arranged to have a conduit connected with the opening 43. A central cavity 21a between the opening 43 and the pressure chamber 41 is adapted to receive the head of the bolt 38 when the valve C is in its wide open position, as illustrated in Fig. 4. A wall surface 41a is engaged by the plate 33 to limit the upward travel of the bolt 38 and its associated diaphragm 26.

It will be understood that the water pressure in the pipe 7 will be communicated to the pressure chamber 41 through the passage 42 in the shank 39 so long as this pressure is above atmospheric to maintain the valve C closed drip-tight.

Should the water pressure in the pipe 7 drop below atmospheric pressure for any reason, then air at atmospheric pressure automatically becomes effective upon the lower side of the diaphragm 26 through the opening 24b in the flange 24 to flex said diaphragm upwardly to expel the water from the chamber 41 through the passage 42 into the inlet 22 and lift the sealing member 36 of the disc 34 from its seat 32, whereby to vent the pipe 7 to the atmosphere to prevent the creation of a vacuum condition in said pipe. It will be noted from Fig. 3 that when the valve C is in its closed position, the lower end of the shank 39 extends into the seat opening to a point a substantial distance below the level of the seat 32. Thus, in a two-inch valve, for example, the shank will terminate at a point about 1⅛ inches below the level of the seating surface 32 when the valve is closed drip-tight. Hence, it will be apparent that when atmospheric pressure raises the disc 34 slightly from the seat 32, the in-rushing air in cooperation with the passage 42 will provide an eductive effect and assist rapid opening of the valve C by withdrawing the spent operating fluid from the chamber 41 and thereby effecting substantially instantaneous opening of the valve C, the plate 33 limiting the opening movement of said valve upon engagement with the wall surface 41a.

It will be further noted that when the valve C is wide open, as illustrated in Fig. 4, the lower extremity of the stem 39 still projects a substantial distance below the level of the seat 32. In a two-inch valve, mentioned as illustrative hereinbefore, the lower end of the shank 39 will still extend to a point about 7/16 of an inch below the level of the seating surface 32 when the valve is wide open. The purpose of this arrangement is to assure prompt closing of the valve C upon restoration of the water pressure in the pipe 7. Thus, as the pressure builds up in the pipe 7 following a vacuum condition, the air is first forced out of the pipe 7 and since there is relatively little friction opposing the air flow it will quickly discharge through the opening of the seat member 31 to the atmosphere through the spaces between the arms 23. However, the flow of water through the seat 31 is subjected to substantial frictional resistance so that a substantial pressure is built up in the inlet 22, and moreover, since the shank 39 projects a substantial distance within the seat 31 a portion of the water is diverted through the passage 42 into the pressure chamber 41, so that a pressure is gradually built up in said chamber effective upon the diaphragm 26 to flex it downwardly and cause the sealing means 36 to seat upon the surface 32 and thus positively cut off the flow of water through the valve C against line pressure. The arrangement of the stem 39 projecting a substantial distance into the seat 31 is quite important since it facilitates both opening and closing of the valve C and determines the sensitivity with which said valve will open and close. It will, therefore, be understood that the length of the shank 39 may be varied to provide the desired degree of sensitivity necessary for a given installation.

It will be noted that the retaining member 37 has its periphery tapered downwardly and inwardly with respect to the opening in the seat 31, and the object of this is to gradually cut off the flow of water through the seat 31 as the retaining member 37 approaches the seating surface 32. It will also be noted that the inner edge of the seating surface 32 provides substantial line contact for engagement by the sealing member 36. The gradual throttling of the flow through the seat 31 and the line contact seating of the sealing member 36 provides for quiet closing of the valve C and eliminates noisy operation and line shock.

It will be understood that various changes may be made in the details of construction of the vacuum breaker valve disclosed herein without departing from the spirit of the invention or the scope of the annexed claims.

What I claim is:

1. An automatic vacuum breaker valve, comprising: a cover; a body including a ring-like flange portion; a flexible diaphragm interposed between said cover and flange portion; means securing said cover, diaphragm and flange portion in assembled relation, said body further including an annular portion spaced from said flange and defining an inlet and means connecting said annular portion and said flange portion in vertically spaced relation, said means being arranged to provide communication of said inlet directly with the atmosphere whenever the valve is open; a seat on said annular portion having an opening for the flow of fluid therethrough; valve disc means disposed between said seat and diaphragm and cooperable with said seat to form a seal therewith at all times except when a vacuum condition exists in said inlet; and means securing said valve disc means to said diaphragm including a member having an unobstructed passageway communicating with said pressure chamber at one end and with said inlet at its opposite end and constituting the sole means for admitting operating fluid into and exhausting operating fluid from said pressure chamber, said member being of such length that its lower end terminates at a point located a substantial distance below the level of said seat when said diaphragm is flexed to a position corresponding to the wide open position of the valve, whereby any operating fluid reaching said inlet is caused to quickly pass through said passageway into said pressure chamber to rapidly build up pressure therein to effect quick closing of the valve, said seat being substantially smaller in external diameter than the inner diameter of said ring-like flange portion, so that atmospheric pressure is effective upon a substantial area of the side of said diaphragm and valve disc means remote from said pressure chamber even when the valve is fully closed, whereby said valve is caused to automatically open immediately upon the occurrence of a vacuum condition in said inlet.

2. An automatic vacuum breaker valve, comprising: a cover; a body including a ring-like flange portion; a flexible diaphragm interposed between said cover and flange portion; means securing said cover, diaphragm and flange portion in assembled relation, said body further including an annular portion spaced from said flange portion and defining an inlet and a plurality of arms diverging outwardly from said annular portion on an angle of about 45° and connecting said annular portion and said flange portion in vertically spaced relation, said arms being arranged to provide communication of said inlet directly with the atmosphere whenever the valve is open; a seat carried by said annular portion and having an opening for the flow of fluid therethrough; valve disc means disposed between said seat and diaphragm and cooperable with said seat to form a seal therewith at all times except when a vacuum condition exists in said inlet; means including a member securing said valve disc means to said diaphragm, said cover being recessed to provide a pressure chamber for operating fluid at the upper side of said diaphragm, said member having an unobstructed passageway communicating with said pressure chamber at one end and with said inlet at its opposite end and constituting the sole means for admitting operating fluid into and exhausting operating fluid from said pressure chamber, said member being of such length that its lower end terminates at a point located a substantial distance below the level of said seat when said diaphragm is flexed to a position corresponding to the wide open position of the valve, whereby any operating fluid reaching said inlet is caused to quickly pass through said passageway into said pressure chamber to rapidly build up pressure therein to effect quick closing of the valve, said seat being substantially smaller in external diameter than the inner diameter of said ring-like flange portion, so that atmospheric pressure is effective upon a substantial area of the side of said diaphragm and valve disc means remote from said pressure chamber even when the valve is fully closed, whereby said valve is caused to automatically open immediately upon the occurrence of a vacuum condition in said inlet.

3. An automatic vacuum breaker valve, comprising: a cover; a body including a ring-like flange; a diaphragm interposed between said cover and flange; means securing said diaphragm and cover to said flange, said cover having a recess serving as a pressure chamber for operating fluid at one side of said diaphragm and having a central cavity communicating with said recess, said body further including an annular portion spaced from said flange and defining an inlet and a plurality of arms connecting said flange and annular portion together in vertically spaced relation, said arms being arranged to provide communication of said inlet directly with the atmosphere whenever the valve is open; a seat carried by said annular portion and having an opening for the flow of fluid therethrough; valve disc means disposed between said seat and diaphragm, said valve disc means being engaged with said seat at all times except when a vacuum condition exists in said inlet; and means including a bolt connecting said valve disc with said diaphragm, said bolt having its head disposed in said pressure chamber and having a shank extending through said diaphragm and valve disc and a nut threaded on said shank to secure the parts together in assembled relation, said shank being provided with an unobstructed longitudinal passageway communicating at one end with said pressure chamber and at its opposite end with said inlet and constituting the sole means for admitting operating fluid into and exhausting operating fluid from said pressure chamber, said bolt head being receivable in said central cavity and said shank being of such length that it extends a substantial distance into the opening of said seat when said diaphragm is flexed to a position corresponding to the wide open position of the valve, whereby any operating fluid reaching said inlet is caused to quickly pass through said passageway into said pressure chamber to rapidly build up pressure therein to effect quick closing of the valve, said seat being substantially smaller in external diameter than the inner diameter of said ring-like flange, so that atmospheric pressure is effective upon a substantial area of the side of said diaphragm and valve disc means remote from said pressure chamber even when the valve is fully closed, whereby said valve is caused to automatically open immediately upon the occurrence of a vacuum condition in said inlet.

4. An automatic vacuum breaker valve, comprising: a body; a cover; a flexible diaphragm interposed between said body and cover; bolt means securing said body, cover and diaphragm in assembled relation, said cover being recessed to provide a pressure chamber for operating fluid at one side of said diaphragm, said body portion including an annular flange having a central opening arranged at the opposite side of said diaphragm, an annular portion spaced from said flange and defining an inlet and a series of circumferentially spaced radial arms diverging outwardly from said annular portion and securing the same to said flange, said arms being arranged to provide communication of said inlet directly with the atmosphere whenever the valve is open; a seat member carried by said annular portion and having an opening for the flow of fluid therethrough, said seat member having a downwardly and outwardly inclined seating surface; a plate member disposed on the pressure chamber side of said diaphragm; a valve disc disposed on the side of the diaphragm adjacent said seat; means carried by said disc cooperable with said seat to form a seal therewith at all times except when a vacuum condition exists in said inlet; and means securing said plate member and valve disc to said diaphragm including a member having an unobstructed passageway communicating at one end with said pressure chamber and at its opposite end with said inlet and constituting the sole means for admitting operating fluid into and exhausting operating fluid from said pressure chamber, said member being of such length as to project below said valve disc and into the opening of said seat a substantial distance when said diaphragm is flexed to a position corresponding to the wide open position of the valve, whereby any operating fluid reaching said inlet is caused to quickly pass through said passageway into said pressure chamber to rapidly build up pressure therein to effect quick closing of the valve, said seat being substantially smaller in external diameter than the diameter of the opening in said annular flange, so that atmospheric pressure is effective upon a substantial area of the side of said diaphragm and valve disc remote from said pressure chamber even when the valve is fully closed, whereby said valve is caused to automatically open immediately upon the occurrence of a vacuum condition in said inlet.

5. An automatic vacuum breaker valve, comprising: a body; a cover; a flexible diaphragm interposed between said body and cover; bolt means securing said body, cover and diaphragm in assembled relation, said cover being recessed to provide a pressure chamber for operating fluid at one side of said diaphragm, said body portion including an annular flange having a central opening arranged at the opposite side of said diaphragm, an annular portion spaced from said flange and defining an inlet and a series of circumferentially spaced radial arms securing said annular portion to said flange, said arms being arranged to provide communication of said inlet directly with the atmosphere whenever the valve is open; a seat member carried by said annular portion having an opening for the flow of fluid therethrough; a plate member in said pressure chamber engaging the adjacent side of said diaphragm; a disc engaging the opposite side of said diaphragm and being movable through the central opening in said flange; a sealing member carried by said disc adapted to engage said seat to form a seal therewith at all times except when a vacuum condition exists in said inlet; a retaining member engaging said sealing member; and a bolt having its head disposed in said pressure chamber and having a shank extending through said plate, diaphragm, disc and retaining member, said shank being threaded at the end thereof remote from said bolt head and having a nut threaded thereon and engaging said retaining member for securing the parts together in assembled relation, said shank further being provided with an unobstructed longitudinal passageway communicating at its inner end with said pressure chamber and at its outer end with said inlet and constituting the sole means for admitting operating fluid into and exhausting operating fluid from said pressure chamber, said cover member including a surface engageable by said plate to limit the upward flexing movement of said diaphragm, and said shank being of such length that it extends a substantial distance into the opening of said seat when said diaphragm is flexed to a position corresponding to the wide open position of the valve, whereby any operating fluid reaching said inlet is caused to quickly pass through said passageway into said pressure chamber to rapidly build up pressure therein to effect quick closing of the valve, said seat being substantially smaller in external diameter than the diameter of the opening in said annular flange, so that atmospheric pressure is effective upon a substantial area of the side of said diaphragm and disc remote from said pressure chamber even when the valve is fully closed, whereby said valve is adapted to automatically open immediately upon the occurrence of a vacuum condition in said inlet.

6. An automatic vacuum breaker valve, comprising: a body; a cover; a flexible diaphragm interposed between said body and cover; bolt means securing said body, cover and diaphragm in assembled relation, said cover being recessed to provide a pressure chamber for operating fluid at one side of said diaphragm, said body portion including a flat annular flange having a central opening arranged at the opposite side of said diaphragm, an annular portion spaced from said flange and defining an inlet and a series of circumferentially spaced radial arms diverging outwardly from said annular portion and securing the same to the lower surface of said flange, said arms being arranged to provide communication of said inlet directly with the atmosphere whenever the valve is open; a seat member carried by said annular portion and having an opening for the flow of fluid therethrough; a plate member in said pressure chamber engaging the adjacent side of said diaphragm; a disc engaging the opposite side of said diaphragm and being movable through the opening in said flange; a sealing member carried by said disc adapted to engage said seat to form a seal therewith at all times except when a vacuum condition exists in said inlet; a retaining member engaging said sealing member; and a bolt having its head disposed in said pressure chamber and having a shank extending through said plate, diaphragm, disc and retaining member, said shank being threaded at the end thereof remote from said bolt head and having a nut threaded thereon and engaging said retaining member for securing the parts together in assembled relation, said shank further being provided with a longitudinal passageway communicating at its inner end with said pressure chamber and at its outer end with said inlet and constituting the sole means for admitting operating fluid into and exhausting operating fluid from said pressure chamber, said cover member including a wall surface engageable by said plate to limit the upward flexing movement of said diaphragm, and said shank being of such length that it extends a substantial distance into the opening of said seat when said diaphragm is flexed to a position corresponding to the wide open position of the valve, whereby any operating fluid reaching said inlet is caused to quickly pass through said passageway into said pressure chamber to rapidly build up pressure therein to effect quick closing of the valve, said seat being substantially smaller in external diameter than the diameter of the opening in said annular flange, so that atmospheric pressure is effective upon a substantial area of the side of said diaphragm and disc remote from said pressure chamber even when the valve is fully closed, whereby said valve is adapted to automatically open immediately upon the occurrence of a vacuum condition in said inlet.

7. A valve comprising: a cover; a body; a flexible diaphragm interposed between said cover and body; means securing said cover, diaphragm and body in assembled relation, said body having an inlet, an outlet and an annular seat portion between said inlet and outlet; a pair of discs, one disposed upon one side of said diaphragm between said diaphragm and cover and the other disposed upon the opposite side of said diaphragm between said diaphragm and said seat, one of said discs having a protuberance on the side thereof adjacent said diaphragm; means securing said discs and diaphragm in assembled relation and applying a clamping force on said diaphragm over the area of said protuberance, said protuberance being of such size relative to the diameter of said discs as to provide for free floating of about 85% of the area of the diaphragm which is disposed between said discs; and means on the disc adjacent said seat cooperable with said seat to form a seal therewith.

8. A valve as defined in claim 7, in which the means for securing the discs and diaphragm in assembled relation includes a fastening element extending through said discs and diaphragm having a longitudinal passageway extending therethrough.

9. A valve as defined in claim 7, in which the means for securing the discs and diaphragm in assembled relation includes a fastening element extending through said discs and diaphragm, said fastening element having a longitudinal passageway extending therethrough and being of such length that it extends a substantial distance into the opening of said seat when said diaphragm is flexed to a position corresponding to the wide open position of the valve.

DONALD G. GRISWOLD.

REFERENCES CITED

The following references are of record in the file of this patent:

UNITED STATES PATENTS

| Number | Name | Date |
|---|---|---|
| 269,886 | Semple | Jan. 2, 1883 |
| 571,786 | Noyes | Nov. 24, 1896 |
| 894,734 | Haas | July 28, 1908 |
| 1,287,119 | Shurtleff | Dec. 10, 1918 |
| 1,626,289 | Langdon | Apr. 26, 1927 |
| 1,706,404 | Jacobson | Mar. 26, 1929 |
| 1,717,052 | Mauck | June 11, 1929 |
| 1,741,250 | Protzer | Dec. 31, 1929 |
| 1,854,467 | Fourness | Apr. 19, 1932 |
| 2,262,823 | Stearns | Nov. 18, 1941 |
| 2,328,007 | Griswold | Aug. 31, 1943 |
| 2,394,911 | Griswold | Feb. 12, 1946 |